United States Patent [19]

Um et al.

[11] Patent Number: 5,245,369
[45] Date of Patent: Sep. 14, 1993

[54] SCENE PROJECTOR

[75] Inventors: Gregory Um, Torrance; Yeon H. Lee, Los Angeles, both of Calif.

[73] Assignee: Aura Systems, Inc., Calif.

[21] Appl. No.: 779,540

[22] Filed: Oct. 18, 1991

Related U.S. Application Data

[63] Continuation-in-part of Ser. No. 448,748, Dec. 11, 1989, Pat. No. 5,126,836, which is a continuation-in-part of Ser. No. 429,987, Nov. 1, 1989, Pat. No. 5,150,205.

[51] Int. Cl.$^5$ ............................................. G03B 21/00
[52] U.S. Cl. .................................... 353/122; 353/99; 353/30; 353/37; 359/70
[58] Field of Search ...................... 353/122, 98, 99, 97, 353/37, 31, 30; 359/38, 70, 528, 530, 546; 358/60, 231

[56] References Cited

U.S. PATENT DOCUMENTS

| | | |
|---|---|---|
| 3,507,984 | 4/1970 | Stavis . |
| 3,510,571 | 5/1970 | Biedermann . |
| 3,760,096 | 9/1973 | Roth . |
| 4,441,771 | 4/1984 | Hornbeck . |
| 4,566,935 | 1/1986 | Hornbeck . |
| 4,571,603 | 2/1986 | Hornbeck et al. .................. 346/160 |
| 4,615,595 | 10/1986 | Hornbeck ............................ 353/122 |
| 4,638,309 | 1/1987 | Ott ...................................... 340/752 |
| 4,680,579 | 7/1987 | Ott ...................................... 340/783 |
| 4,705,361 | 11/1987 | Frazier et al. . |
| 4,710,732 | 12/1987 | Hornbeck . |
| 4,856,863 | 8/1989 | Sampsell et al. . |
| 4,859,012 | 8/1989 | Cohn . |
| 4,956,619 | 9/1990 | Hornbeck ............................ 330/43 |
| 4,971,436 | 11/1990 | Aoki et al. ........................... 353/98 |
| 5,022,750 | 6/1991 | Flasck ................................. 353/81 |
| 5,028,939 | 7/1991 | Hornbeck et al. .................. 346/160 |

FOREIGN PATENT DOCUMENTS 62-115120  5/1987  Japan ..................................... 353/98

OTHER PUBLICATIONS

Television-A New Schlieren Light Valve for Television Projection, by Van Raalte, Applied Optics, vol. 9, No. 10, Oct. 1970, pp. 2225-2230.

The Mirror-Matrix Tube: A Novel Light Valve for Projection Display, by Thomas et al., IEEE Transactions on Electron Devices, vol. ED-22, No. 9, Sep. 1975, pp. 765-775.

Dynamic Micromechanics on Silicon: Techniques and Devices, by Petersen, IEEE Transactions on Electron Devices, vol. ED-25, No. 10, Oct. 1978, pp. 1241-1250.

TV Projection Display Using an Amorphous-Se-Type Ruticon Light Valve, by Lakatos et al., IEEE Transactions on Electron Devices, vol. ED-24, No. 7, Jul. 1977, pp. 930-934.

Micromechanical Light Modulator Array Fabricated on Silicon, by Petersen, Applied Physics Letters, vol. 31, No. 8, Oct. 15, 1977, pp. 521-523.

Primary Examiner—William A. Cuchlinski, Jr.
Assistant Examiner—William C. Dowling
Attorney, Agent, or Firm—Anthony T. Cascio; Lisa A. Clifford

[57] ABSTRACT

Optical energy from a broadband source is focused on an aperture in an opaque member. The energy exiting the aperture is received off axis by a parabolic mirror which collimates the energy. The collimated energy is reflected from each planar mirror of an actuated mirror array. The reflected energy from the mirror array is re-reflected to the aperture by the parabolic mirror. The orientation of each planar mirror determines the flux which passes through the aperture or is reflected by a reflective face of the opaque member. The energy reflected from this face which is derived from each mirror corresponds to the flux intensity for a corresponding pixel. This energy may then be focused on a screen to display the scene.

6 Claims, 1 Drawing Sheet

SCENE PROJECTOR

This is a continuation-in-part of copending U.S. patent application Ser. No. 07/448,748, filed Dec. 11, 1989 now U.S. Pat. No. 5,126,836, which is a continuation-in-part of co-pending U.S. patent application Ser. No. 07/429,987, filed Nov. 1, 1989 now U.S. Pat. No. 5,150,205.

RELATED APPLICATION DATA

The present application is related to the following commonly owned, co-pending applications: Ser. No. 07/429,987, Ser. No. 07/448,748, now issued as U.S. Pat. No. 5,126,836, Ser. No. 07/494,579, and Ser. No. 07/504,125, heretofore filed, and to Ser. No. 07/779,345, and Ser. No. 07/779,346 filed concurrently herewith, each of which is incorporated herein by reference.

FIELD OF THE INVENTION

The present invention relates generally to optical projection systems and more particularly to a novel scene projector using an actuated mirror array to effect modulation of pixel intensity.

BACKGROUND OF THE INVENTION

Actuated mirror arrays are useful for one component in the modulation of light intensity wherein the beam reflected from each mirror is modulated by the flux of such beam passing through a slit aperture, as disclosed in Ser. No. 07/429,987 and Ser. No. 07/448,748. As described therein, the flux is controlled by the orientation of the mirror relative to the aperture. A piezoelectric actuator has been disclosed for actuating each mirror in response to an electrical sign applied to each actuator. The electrical signal is commensurate with the degree of modulation desired. The control circuitry for the actuators has been described in Ser. No. 07/504,125. Several examples of piezoelectric actuators and mirror arrays constructed therefrom are disclosed in Ser. No. 07/494,579.

SUMMARY OF THE INVENTION

According to the present invention, optical energy from a broadband source is focused on an aperture in an opaque member. The energy exiting the aperture is received off axis by a parabolic mirror which collimates the energy. The collimated energy is reflected from each planar mirror of an actuated mirror array. The reflected energy from the mirror array is re-reflected to the aperture by the parabolic mirror. The orientation of each planar mirror determines the flux which passes through the aperture or is reflected by a reflective face of the opaque member. The energy reflected from this face which is derived from each mirror corresponds to the flux intensity for a corresponding pixel. This energy may then be focused on a screen to display the scene.

These and other objects, advantages and features of the present invention will become readily apparent to those skilled in the art from a study of the following Description of an Exemplary Preferred Embodiment when read in conjunction with the attached Drawing and appended Claims.

DESCRIPTION OF AN EXEMPLARY PREFERRED EMBODIMENT

Figure 1:
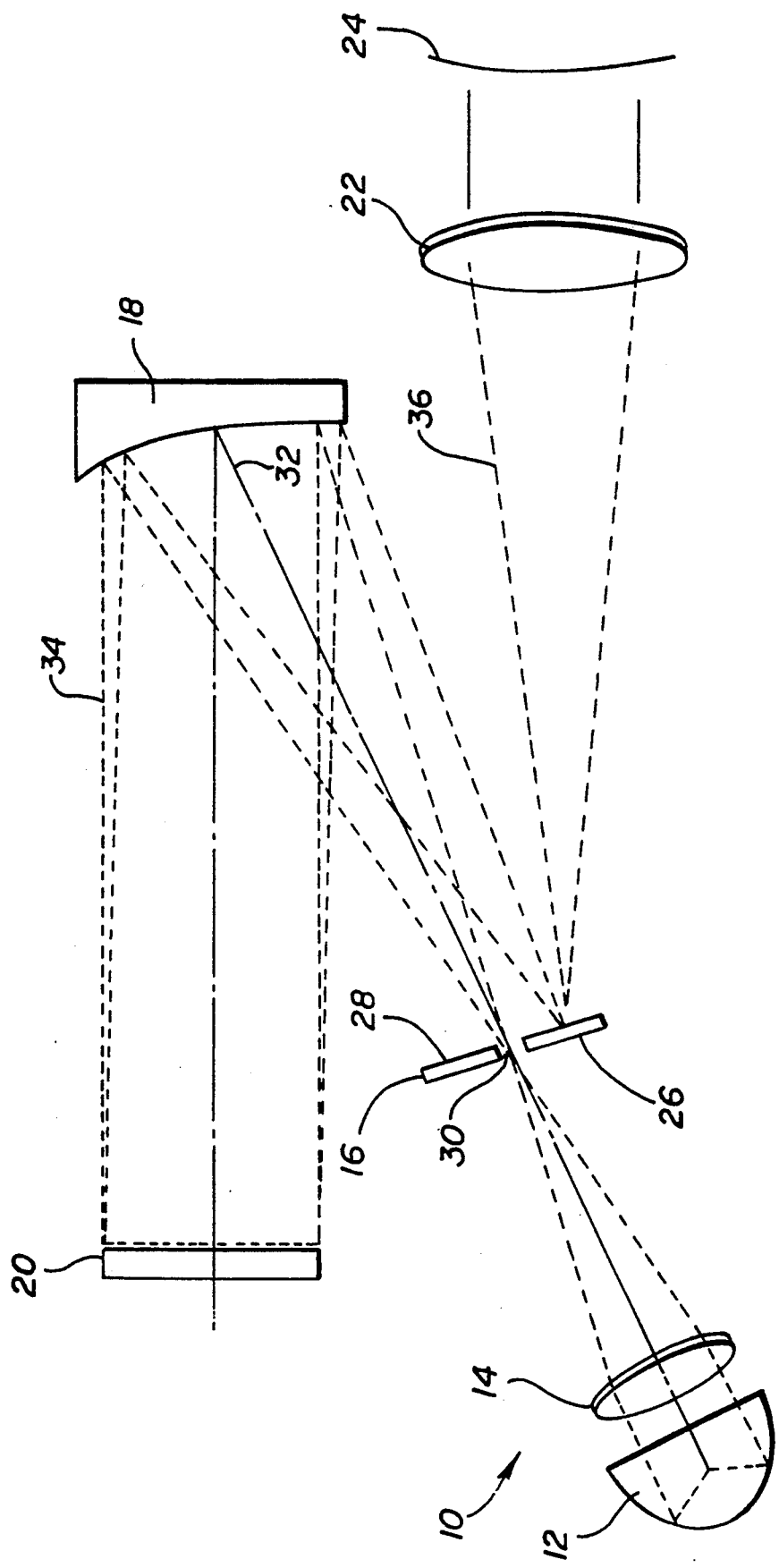
FIG. 1 is a schematic view of a scene projector constructed according to the principles of the present invention.

Referring now to the Drawing, there is shown a scene projector constructed according to the principles of the present invention. The scene projector 10 includes a source 12 of optical energy, a focusing lens 14, an optically opaque member 16, a parabolic mirror 18, an actuated mirror array 20, a collimating lens 22 and a screen 24.

The source 12 may be any broadband source of energy. The energy may also be in the spectrum long wave infrared (LWIR) to ultraviolet (UV).

The member 16 has a first face 26, a second face 28 and an aperture 30. The second face is optically reflective for reasons to become readily apparent hereinbelow.

The focusing lens is disposed intermediate the first face 26 of the member 16 and the source 12. The lens 14 focuses the optical energy emitted from the source 12 into the aperture 30. The optical energy exits the aperture 30 along a first propagation path 32.

The parabolic mirror is disposed off-axis in the first propagation path 32, or stated otherwise, the focal axis of the parabolic mirror is not coincident with the first propagation path 32. Accordingly, optical energy propagating along the first propagation path 32 is reflected from the parabolic mirror along a second propagation path 34 toward the mirror array 20. The offset of the focal axis of the parabolic mirror 18 from the first propagation path 32 is selected so that the parabolic mirror 18 collimates the optical energy emanating from the aperture 30.

Each mirror of the mirror array 20 is disposed in the second propagation path 34. The orientation of each mirror determines the intensity of a respective pixel to be displayed at the screen 24. For example, if the plane of a particular mirror is normal to the second propagation path 34, the optical energy reflected therefrom will return to the parabolic mirror 18 along the second propagation path 34. The parabolic mirror 18 will then re-reflect such energy back along the first propagation path 32 through the aperture 30. However, if the plane of the mirror is offset from normal, the reflected optical energy will be along a path diverging from the second propagation path. When this divergent energy is re-reflected from the parabolic mirror 18 toward the aperture 30, the path will also be offset from the first propagation path 32. Accordingly, increasing offset of the plane of the mirror will decrease the flux of the optical energy returning to the aperture 30 and thereby increase the flux of optical energy reflected from the second face 28.

As described in commonly owned U.S. Pat. No. 5,126,836 at col. 2, line 54 to col. 3 line 22 and at col. 4, line 67 to col. 5, line 27, each mirror of the mirror array 20 corresponds to a respective pixel of the scene projector. Each mirror of the mirror array is tilted, vibrated, or bent at an angle in accordance with the predetermined intensity of the pixel. The mirror arrays include a plurality of reflective surfaces, each mounted on a piezoelectric crystal base. Several embodiments of the actuated mirror arrays are described in commonly-owned U.S. Pat. No. 5,126,836 at col. 2, line 65 to col. 4, line 66. The light beams are each modulated by applying an electrical signal to the piezoelectric crystal under each mirror. More specifically, when a voltage is applied to the piezoelectric crystal of the mirror, the reflective surface of each mirror vibrates, tilts, or bends, depending on the embodiment used, and cause the beams reflecting off of the mirror reflect along a path varying from the second propagation path 34. As a result, at least a portion of the reflected light beam reflects off the second face of the member 16, and towards the screen 24. When a voltage is not applied to the piezoelectric crystals 52, the reflective surfaces do not vibrate, tilt, or bend, and the beams reflected off of the mirror return along the same path as the second propagation path and are aimed at the aperture of the member 16. The reflected light beam then passes through the aperture, and does not reflect off the second face 28 of the member 16 towards the screen 24. Therefore, the degree of vibrating, tilting, or bending of the mirror determines the amount of light which reflects off the second face 28 of the member 16, which in turn determines the intensity of the respective pixels.

As described in commonly-owned U.S. patent application Ser. No. 07/504,125, at page 1, line 29 to page 3, line 5, the scene projector may utilize a single modulated beam, wherein the beam is scanned horizontally in successive lines on a screen to develop the image. If the projector utilizes multiple modulated beams of light, each beam may be used to scan one row, respectively, in the image. The multiple beams simultaneously traverse the screen in a pattern called "push trace" scanning. During the push trace horizontal scanning, the beam intensity in each beam is modulated for each column of pixels to form the image. A multiple beam system is disclosed in the commonly-owned U.S. patent application Ser. No. 07/429,987. In the multiple beam system disclosed in U.S. application Ser. No. 07/429,987 application, the beams were horizontally swept by a rotating polygonal mirror. However, in commonly owned U.S. Pat. No. 5,126,836, the rotating mirror is eliminated by providing a M×N mirror array. The reflected beam from each each mirror is used to develop each pixel in the displayed M×N image. In the system utilizing the M×N mirror array, each beam was modulated by applying an electrical signal to the piezoelectric crystal under each mirror. Commonly owned U.S. patent application Ser. No. 07/504,125 discloses a switching matrix for use in applying the appropriate electrical signals to the piezoelectric crystals. Two alternative switching matrices are described in detail in commonly-owned U.S. patent application Ser. No. 07/504,125, at page 6, line 24 to page 14, line 17.

The reflected optical energy from the second face 28 propagates along a third propagation path 36. The collimating lens 22 is disposed in the third propagation path to eliminate the fan out of this energy and collimate it for display on the screen 24.

The optical energy reflected from each mirror will follow a similar path depending on its particular present orientation. Typical mirror arrays and the driving circuit have been disclosed in the above referenced patents. In one embodiment of the present invention, the aperture 30 is a pinhole.

There has been described hereinabove a novel scene projector which uses an actuated mirror array. Those skilled in the art may now make numerous uses of and departures from the above described embodiments without departing from the inventive concepts disclosed herein. Accordingly, the present invention is to be defined solely by the scope of the following claims.

I claim:
1. An apparatus to modulate the intensity of a pixel comprising:
   a source of optical energy;
   an optically opaque member having a first face, a second face, and an aperture therethrough, said second face being optically reflective;
   a focusing lens to focus optical energy from said source at said aperture, said energy exiting said aperture along a first propagation path;
   a parabolic mirror disposed off-axis in said first propagation path to reflect said energy along a second propagation path;
   a planar mirror disposed in said second propagation path of reflect said energy in a return direction along said second path to said parabolic mirror, said planar mirror being associated with the pixel, the energy reflected from said planar mirror being re-reflected by said parabolic mirror toward said aperture, the orientation of said planar mirror determining the flux of the re-reflected energy passing through said aperture and reflected by said second face along a third propagation path wherein the amount of flux reflected by said second face along the third propagation path controls the intensity of said pixel; and
   a screen in said third propagation path upon which energy reflected from said second face is focused to display said pixel.

2. An apparatus as set forth in claim 1 further comprising a collimating lens disposed between said second face and said screen to focus energy propagating along said third path of said screen.

3. An apparatus as set forth in claim 1 wherein said aperture is a pinhole.

4. A scene projector to display an image as an array of pixels comprising:
   a source of optical energy;
   an optically opaque member having a first face, a second face, and an aperture therethrough, said second face being optically reflective;
   focusing lens to focus optical energy from said source at said aperture, said energy exiting said aperture along a first propagation path;
   a parabolic mirror disposed off-axis in said first propagation path to reflect said energy along a second propagation path;
   an actuated mirror array having a plurality of planar mirrors, each of said planar mirrors corresponding to a respective one of said pixels, and each of said mirrors being disposed in said second propagation path to reflect said energy in a return direction along said second path to said parabolic mirror, the energy reflected from each of said planar mirrors being re-reflected by said parabolic mirror toward said aperture, the orientation of each of said planar mirrors determining the flux of the re-reflected energy passing through said aperture and reflected by said second face along a third propagation path wherein the amount of flux reflected by said second face controls the intensity of the respective one of said pixels; and
   a screen disposed in said third propagation path upon which energy reflected from said second face is focused to display said pixels.

5. An apparatus as set forth in claim 4 further comprising a collimating lens disposed between said second face and said screen to focus energy propagating along said third path on said screen.

6. An apparatus as set forth in claim 4 wherein said aperture is a pinhole.

* * * * *